United States Patent Office 3,173,971
Patented Mar. 16, 1965

3,173,971
NEW DIEPOXIDE-CONTAINING POLYESTER RESINS AND COATING COMPOSITIONS CONTAINING THEM
Howard T. Roth, Ridgewood, Charles H. Lamendola, Brooklyn, and Norman J. Kennedy, Manhasset, N.Y., assignors to Interchemical Corporation, New York, N.Y., a corporation of Ohio
No Drawing. Filed Jan. 19, 1961, Ser. No. 83,626
8 Claims. (Cl. 260—834)

This invention relates to new organic solvent soluble diepoxide modified polyester resins compatible with amine-aldehyde resins and reactive therewith under heat-curing conditions to yield very durable surface coatings having unusually high resistance to detergents, soap, solvents, water, salt spray, and food staining.

It is known that extremely hard thermosetting resins resistant to staining and scratching can be made by the reaction of formaldehyde or other aldehyde with polyfunctional amines, such as urea, biuret, and dicyandiamide, but especially with triazines like ammeline, melamines, benzoguanamine, etc. When these resins are used alone in surface coatings they are not satisfactory for most applications since they have poor adhesion to metal surfaces and poor flexibility. Nevertheless, owing to their extraordinary hardness and good resistance to alkalies and detergents, highly desirable properties in surface coating applications, many efforts have been made to modify their poor adhesion to metal and poor flexibility. Such improvement has been achieved for example by combining them with oil-modified alkyd resins. The polyester, or alkyd combination, however, leaves much to be desired in the way of resistance to detergents and soaps. This weakness is particularly underlined when such finishes are used for kitchen appliances and washing machines.

It has now been discovered that oil-free isophthalic-acid-based polyesters containing no ethylenically unsaturated dibasic acids and modified with various aliphatic and aromatic diepoxides, when blended with aminoplasts, produce films with unusually high detergent resistance and other desirable properties such as good flexibility, toughness, resistance to discoloration, and good adhesion to metal. In typical resins diepoxides were reacted with adipic or isophthalic acids by means of a tertiary amine catalyst to form half esters which were then condensed with the polyols and monobasic acids until an acid value of 10 to 35 was reached. Monoepoxides yielded inferior products. Diepoxides tried and found to be effective in this application were 1,4-butanediol diglycidyl ether, vinyl cyclohexene dioxide, dicyclopentadiene dioxide, dipentene dioxide, 3,4 - epoxy-6-methylcyclohexylmethyl-3,4-epoxy-6-methylcyclohexane carboxylate, bis-epoxy-dicyclopentyl ether of ethylene cyclol, and epoxidized soya bean oil. Other diepoxide compounds that may be used are those reaction products of epichlorohydrin and 2,2-bis (p-hydroxy phenyl) propane (bis-phenol) having melting points ranging from 8° C. to 76° C., epoxide equivalents ranging from 180 to 550, esterification equivalents from 80 to 130, and molecular weights from about 350 to about 900. While neopentyl glycol is preferred as the dihydric alcohol 1,3-butylene glycol is also very suitable. Trimethylol ethane is preferred for the polyhydric alcohol having at least 3-hydroxy groups, but trimethylol propane, 1,2,6-hexane triol, and pentaerythritol are good substitutes.

These polyesters were evaluated by formulating them into enamels at a 40/60 pigment/vehicle ratio in all cases. The vehicle consisted of 60% polyester, 24% benzoguanamine, and 16% of a 1:1 butanol-xylol mixture. The enamels were then tested as one-coat systems on 20-gauge phosphatized steel. The baking schedule of the enamels was 350° F. for 30 minutes. The enameled panels were then subjected to tests for reverse impact, 20 to 10 inch-pounds; tests of flexibility, detergent resistance (according to ASTM procedure D714–45); pencil hardness; color; gloss; and overbake retention of color and gloss.

Flexibility was tested on the conical mandrel. The panel was bent 180° in 15 seconds. "Good" indicates an intact film over the complete bend, down to a rod ⅛ inch in diameter. "Poor" indicates complete failure (unable to withstand a bend over a ¾-inch rod).

"Good resistance to reverse impact" indicates ability to withstand the reverse impact of a 20 inch-pounds without cracking. "Fair" withstands 10 inch-pounds but not 20. "Poor" withstands neither.

Color was determined by making simplified whiteness measurements with a G.E. spectrophotometer. Readings were taken at 450 millimicrons. The higher the reading, the less the yellow component of the color.

The overbake was performed by heating the panel one hour at 400° F.

Gloss was appraised visually.

Hardness was tested by finding the hardest pencil that would not cut the surface of the film (6B, 5B, 4B, 3B, 2B, B, HB, F, H, 2H, etc., to 9H, the hardest).

Parts are parts by weight—unless stated to be otherwise.

*Example 1*

(A)

| | |
|---|---|
| Adipic acid | 328.5 |
| 1,4-butanediol diglycidyl ether | 227 |
| N,N dimethyl benzylamine | 1.70 |

(B)

| | |
|---|---|
| Pelargonic acid | 720 |
| Neopentyl glycol | 316 |
| Trimethylol ethane | 405 |
| Isophthalic acid | 747 |

(C)

| | |
|---|---|
| Xylene | 110 |

Combination A was heated at 120–125° C. under $CO_2$ and an air-cooled condenser until the acid number was 230 to 250. B was added and the mixture then heated to 165–170° C. From that point the temperature was gradually raised over a period of 3 hours to 235–240° C. and held there 30 minutes. It was then cooled to 170° C., and C was added. Azeotropic distillation was conducted at 215–230° C. until the acid value reached 27–29. The mix was cut with 3/2 xylene:butanol to a solids content of 60%.

The enamel made from this resin displayed outstanding detergent resistance with good color and gloss retained on overbake. It had a good reverse impact resistance and good flexibility.

*Example 2*

(A)

| | |
|---|---|
| Adipic acid | 328.5 |
| Vinyl cyclohexane dioxide | 157.5 |
| N,N-dimethyl benzylamine | 1.18 |

(B)

| | |
|---|---|
| Pelargonic acid | 720 |
| Neopentyl glycol | 516 |
| Trimethylol ethane | 405 |
| Isophthalic acid | 747 |

(C)

| | |
|---|---|
| Xylene | 107 |

Combination A was heated at 120–125° C. under $CO_2$ and an air-cooled condenser until the acid number was 260–280. B was added and the mixture heated to 165–170° C. From this point the temperature was gradually raised to 235–240° C. over a period of 3 hours. Heating at 235–240° C. was continued for 45 minutes, then the mix was cooled to 170° C. C was added and azeotropic distillation carried out at 220–230° C. until the acid number reached 26–28. Enough 3/2 xylene: butanol solvent was added to reduce the solids content to 60%. The enamel from this resin was equal to the preceding one, except that the flexibility and impact resistance were somewhat less.

Example 3

(A)

| | |
|---|---|
| Adipic acid | 131.5 |
| Liquid condensate of bisphenol and epichlorohydrin having an epoxide equivalent of about 190, a melting point of 90° C., and a molecular weight of about 350 | 174.0 |
| N,N-dimethylbenzylamine | 0.87 |

(B)

| | |
|---|---|
| Isophthalic acid | 299 |
| Pelargonic acid | 288 |
| Neopentyl glycol | 150 |
| Trimethylol ethane | 187 |

(C)

| | |
|---|---|
| Xylene | 61 |

Combination A was heated to 165–170° C. under $CO_2$ and an air-cooled condenser until the acid value was 259–260. B was added and the mixture heated to 165–170° C. Then over a period of 3 hours the temperature was gradually raised to 235–240° and held there until the batch was clear. It was cooled to 170° C., C added, and azeotropic distillation carried out until the acid value reached 22–24. The enamel from this resin had good detergent resistance, good color and gloss even on overbake, the flexibility was good, and the impact resistance fair.

Example 4

(A)

| | |
|---|---|
| Isophthalic | 299 |
| 1,4-butanediol diglycidyl ether | 182 |
| N,N-dimethyl benzylamine | 1.37 |

(B)

| | |
|---|---|
| Pelargonic acid | 288 |
| Adipic acid | 131.5 |
| Neopentyl glycol | 126 |
| Trimethylol ethane | 162 |
| Xylene | 59 |

Combination A was heated at 120–125° C. under $CO_2$ and an air condenser until the acid value was 209–210° C. B was added and azeotropic distillation carried out to an acid value of 23–30. Enough 3/2 xylene:butanol solvent was added to make the solids content 60%.

The enamel's detergent resistance was very good as was also the color and gloss even on overbake, however, the flexibility and reverse impact resistance were poor.

Example 5

(A)

| | |
|---|---|
| Adipic acid | 85 |
| Vinyl cyclohexane dioxide | 41 |
| Triethylamine | 0.30 |

(B)

| | |
|---|---|
| Isophthalic acid | 287 |
| Fumaric acid | 33 |
| Pelargonic acid | 187 |
| Para tertiary butyl benzoic acid | 100 |
| Neopentyl glycol | 134 |
| Trimethylol ethane | 172 |

(C)

| | |
|---|---|
| Xylene | 52 |

Combination A was heated at 120–125° C. under $CO_2$ and an air-cooled condenser until the acid value was 259–260. B was added and the mixture heated to 165–170° C. Over a 3-hour period the temperature was gradually raised to 235–240° C. and held there until the batch was clear. It was cooled to 170° C. and C added after which azeotropic distillation was carried out until the acid value reached 22–24.

The detergent resistance was excellent as well as the color and gloss. Flexibility and reverse impact resistance were poor.

Example 6

By procedures similar to the foregoing examples, a resin was made from 0.30 equivalents of dipentene oxide, 1.20 equivalents of isophthalic acid, 0.60 equivalents of adipic acid, 0.60 equivalents of pelargonic acid, 0.81 equivalents of neopentyl glycol, and 1.35 equivalents of trimethylol ethane. The solids concentration was adjusted to 60%. Detergent resistance was fairly good, color fairly good, gloss good including overbake appearance. Reverse impact resistance and flexibility were good but it was appreciably softer than in the case of the previous 6 examples.

Example 7

The components, quantities, and procedures specified in Example 6 were used, except that 3,4-epoxy-6-methylcyclohexylmethyl - 3,4 - epoxy-6-methylcyclohexane carboxylate was used instead of dipentene dioxide.

The detergent resistance was excellent. The physical properties were good except that gloss and reverse impact resistance were only fair.

Example 8

Example 6 was repeated, but using dicyclopentadiene dioxide for the diepoxide. The enamel showed excellent detergent resistance, good gloss and flexibility, and fair reverse impact resistance. The color had a slight yellowish cast but did not appreciably worsen on overbake.

Example 9

Using the same type of procedure as in the foregoing examples a resin was made, the components and their quantities in equivalents being epoxidized soya bean oil (a diepoxide) 0.24, isophthalic acid 1.20, adipic acid 0.60, para-tertiary butyl benzoic acid 0.60, neopentyl glycol 0.99, trimethylol ethane 1.65. The enamel had fairly good detergent resistance. The color was fair and the gloss good but retention on overbake was poor. Flexibility and reverse impact resistance were poor.

What is claimed is:

1. An organic solvent soluble oil-free, diepoxidized polyester consisting of the condensation product of (A) about 2 parts of a half ester formed from a dibasic acid selected from the group consisting of adipic acid and isophthalic acid and a diepoxide compound selected from the group consisting of 1,4-butanediol diglycidyl ether; vinyl cyclohexene dioxide; dicyclopentadiene dioxide; dipentene dioxide; 3,4-epoxy-6-methyl cyclohexylmethyl-3,4-epoxy-6-methylcyclohexane carboxylate; bis-epoxy-dicyclopentyl ether of ethylene glycol, epoxidized soya bean oil; and those reaction products of epichlorohydrin and 2,2-bis(p-hydroxy phenyl) propane having melting points ranging from 8° C. to 76° C., epoxide equivalents ranging from 180 to 550, esterification equivalents from 80 to 130, and molecular weights from about 350 to about 900 and (B) about 3 to 16 parts of a mixture of (1) a monobasic acid selected from the group consisting of monocarboxylic aliphatic acids having a chain length of 8–12 carbon atoms and para-tertiary butyl benzoic acid, (2) a dihydric alcohol selected from the group consisting of neopentyl glycol and 1,3 butylene glycol, (3) a polyhydric alcohol containing at least 3 hydroxyl groups selected from the group consisting of trimethylol ethane, trimethylol propane, 1,2,6-hexane triol, and pentaerythritol, and (4) a dibasic acid selected from the group consisting of isophthalic acid and adipic acid, the dibasic acid in (A) being different from the dibasic acid in (B).

2. An organic solvent soluble, oil-free, diepoxidized polyester consisting of the condensation product of (A) about 2 parts of a half ester formed from a dibasic acid selected from the group consisting of adipic acid and isophthalic acid and a diepoxide compound selected from the group consisting of 1,4-butanediol diglycidyl ester; vinyl cyclohexene dioxide; dicyclopentadiene dioxide; dipentene dioxide; 3,4-epoxy-6-methyl cyclohexylmethyl-3,4-epoxy-6-methylcyclohexane carboxylate; bis-epoxy-dicyclopentyl ether of ethylene glycol, epoxidized soya bean oil; and those reaction products of epichlorohydrin and 2,2-bis(p-hydroxy phenyl) propane having melting points ranging from 8° C. to 76° C., epoxide equivalents ranging from 180 to 550, esterification equivalents from 80 to 130, and molecular weights from about 350 to about 900 and (B) about 3 to 16 parts of a mixture of (1) neopentyl glycol, (2) trimethylol ethane, (3) a monobasic acid selected from the group consisting of pelargonic acid, lauric acid, capric acid, isodecanoic acid, and para-tertiary butyl benzoic acid, and (4) a dibasic acid selected from the group consisting of isophthalic acid and adipic acid, the dibasic acid in (A) being different from the dibasic acid in (B).

3. A polyester as described in claim 1 in which the diepoxide is 1,4-butanediol diglycidyl ether and the monobasic acid is pelargonic acid.

4. A polyester as described in claim 1 in which the diepoxide is vinyl cyclohexene dioxide and the monobasic acid is pelargonic acid.

5. A heat-curable surface coating composition comprising a volatile organic solvent solution of a polyester as defined in claim 1 and an organic solvent soluble amine aldehyde resin selected from the group consisting of triazine-formaldehyde resins and urea-formaldehyde resins.

6. A heat-curable surface coating composition comprising a volatile organic solvent solution of a polyester as defined in claim 2 and an organic solvent soluble amine aldehyde resin selected from the group consisting of triazine-formaldehyde resins and urea-formaldehyde resins.

7. A heat-curable surface coating composition comprising a volatile organic solvent solution of a polyester as described in claim 3 and an organic solvent soluble amine aldehyde resin selected from the group consisting of triazine-formaldehyde resins and urea-formaldehyde resins.

8. A heat-curable surface coating composition comprising a volatile organic solvent solution of a polyester as described in claim 4 and an organic solvent soluble amine aldehyde resin selected from the group consisting of triazine-formaldehyde resins and urea-formaldehyde resins.

References Cited by the Examiner

UNITED STATES PATENTS

| 2,734,876 | 2/56 | Bradley | 260—45.4 |
| 2,799,663 | 7/57 | Hampton et al. | 260—45.4 |
| 2,830,965 | 4/58 | Ott | 260—45.4 |
| 3,028,362 | 4/62 | Zimmermann | 260—45.4 |
| 3,039,979 | 6/62 | Carlick et al. | 260—76 X |

FOREIGN PATENTS 742,532  12/55  Great Britain.

LEON J. BERCOVITZ, *Primary Examiner.*

D. ARNOLD, DONALD CZAJA, *Examiners.*